(12) United States Patent
Ogino

(10) Patent No.: US 11,742,511 B2
(45) Date of Patent: Aug. 29, 2023

(54) LINKED BATTERY MODULE AND LINKED BATTERY PACK

(71) Applicant: Panasonic Intellectual Property Management Co., Ltd., Osaka (JP)

(72) Inventor: Hirotaka Ogino, Osaka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 142 days.

(21) Appl. No.: 16/631,492

(22) PCT Filed: Jul. 18, 2018

(86) PCT No.: PCT/JP2018/026968
§ 371 (c)(1),
(2) Date: Jan. 16, 2020

(87) PCT Pub. No.: WO2019/021912
PCT Pub. Date: Jan. 31, 2019

(65) Prior Publication Data
US 2020/0176747 A1    Jun. 4, 2020

(30) Foreign Application Priority Data

Jul. 28, 2017   (JP) .................................. 2017-146739

(51) Int. Cl.
*H01M 10/04* (2006.01)
*H01M 10/48* (2006.01)
(Continued)

(52) U.S. Cl.
CPC ..... *H01M 10/0413* (2013.01); *H01M 10/058* (2013.01); *H01M 10/482* (2013.01);
(Continued)

(58) Field of Classification Search
CPC .............. H01M 50/502; H01M 50/20; H01M 10/0413; H01M 10/058; H01M 10/482
See application file for complete search history.

(56) References Cited

U.S. PATENT DOCUMENTS

| 2011/0008659 A1* | 1/2011 | Okada ................... H01M 50/20 |
| | | 429/90 |
| 2011/0159336 A1 | 6/2011 | Ohkura et al. |

(Continued)

FOREIGN PATENT DOCUMENTS

| CN | 102110841 A | 6/2011 |
| CN | 105990625 A | 10/2016 |

(Continued)

OTHER PUBLICATIONS

International Search Report of PCT application No. PCT/JP2018/026968 dated Oct. 9, 2018.
(Continued)

*Primary Examiner* — Matthew T Martin
*Assistant Examiner* — Jessie Walls-Murray
(74) *Attorney, Agent, or Firm* — McDermott Will & Emery LLP

(57) ABSTRACT

A linked battery module includes a first battery module and a second battery module having a same configuration. The first battery module includes: a battery stack that includes rectangular batteries, stacked in a row in a thickness direction; a restraint member on one side that restrains one side, in a Y direction, of the battery stack; a restraint member on the other side that restrains the other side, in the Y direction, of the battery stack; an end plate on one side that restrains one side, in an X direction, of the battery stack; and an end plate on the other side that restrains the other side, in the X direction, of the battery stack. A linking unit links the end
(Continued)

plate on one side of the first battery module to the end plate on the other side of the second battery module.

4 Claims, 6 Drawing Sheets

(51) Int. Cl.
  *H01M 50/262* (2021.01)
  *H01M 50/264* (2021.01)
  *H01M 50/209* (2021.01)
  *H01M 50/289* (2021.01)
  *H01M 10/058* (2010.01)

(52) U.S. Cl.
  CPC ....... *H01M 50/209* (2021.01); *H01M 50/262* (2021.01); *H01M 50/264* (2021.01); *H01M 50/289* (2021.01)

(56) References Cited

U.S. PATENT DOCUMENTS

| | | | |
|---|---|---|---|
| 2013/0288105 A1* | 10/2013 | Niedzwiecki | H01M 50/20 |
| | | | 429/156 |
| 2016/0285142 A1* | 9/2016 | Kimura | H01M 50/20 |
| 2018/0269443 A1* | 9/2018 | Takahashi | H01M 50/262 |

FOREIGN PATENT DOCUMENTS

| | | | | |
|---|---|---|---|---|
| CN | 106601958 A | * | 4/2017 | H01M 2/1072 |
| JP | 2011-151006 | | 8/2011 | |
| JP | 2017-059299 | | 3/2017 | |
| JP | 2018-156825 A | | 10/2018 | |

OTHER PUBLICATIONS

English Translation of Chinese Office Action dated Jan. 17, 2022 for the related Chinese Patent Application No. 201880049579.7.

* cited by examiner

LINKED BATTERY MODULE AND LINKED BATTERY PACK

CROSS-REFERENCE TO RELATED APPLICATIONS

This application is a U.S. national stage application of the PCT International Application No. PCT/JP2018/026968 filed on Jul. 18, 2018, which claims the benefit of foreign priority of Japanese patent application 2017-146739 filed on Jul. 28, 2017, the contents all of which are incorporated herein by reference.

TECHNICAL FIELD

The present disclosure relates to a linked battery module that includes a plurality of battery modules that have been linked. Further, the present disclosure relates to a linked battery pack that includes a plurality of battery packs that have been linked.

BACKGROUND ART

A conventional battery pack is disclosed in PTL 1. The battery pack includes a plurality of battery modules, and a housing. Each of the battery modules includes a plurality of battery cells stacked in a row in a thickness direction. The plurality of battery cells that have been stacked are in a same posture. The battery modules are separately attached to a bottom plate of the housing with bolts.

CITATION LIST

Patent Literature

PTL 1: Unexamined Japanese Patent Publication No. 2017-59299

SUMMARY OF THE INVENTION

For the above battery pack, the plurality of battery modules are separately bolted to the bottom plate of the housing. Therefore, a lot of work is needed to attach the battery modules to the housing. Further, each of the battery modules is heavy. For the above battery pack, the plurality of battery modules are separately bolted to the bottom plate of the housing. Therefore, the bottom plate of the housing needs to support a weight of each of the battery modules. Therefore, the housing needs to have strength, and thus a size and a weight of the housing are likely to increase.

Especially if a battery pack is attached to a vehicle and the battery pack supplies high electric power, short circuit at high-voltage cables needs to be surely prevented even if shock is conveyed to the battery pack when the vehicle collides, for example. Consequently, rigidity of the housing is likely to increase, and thus a size and a weight of the housing are likely to increase.

It is an object of the present disclosure to provide a linked battery module and a linked battery pack that each allow battery modules to be easily attached, and each allow a weight and a size to be easily reduced.

A linked battery module according to an aspect of the present disclosure, includes a first battery module and a second battery module that are linked together with a linking unit. Each of the first battery module and the second battery module includes: a battery stack that includes a plurality of rectangular batteries that each have a substantially rectangular-parallelepiped shape, and are stacked in a row in a thickness direction; a restraint member on one side in a perpendicular direction that is perpendicular to a stacking direction of the battery stack, the restraint member on the one side in the perpendicular direction restraining at the one side in the perpendicular direction, such that side surfaces of the rectangular batteries on the one side in the perpendicular direction, are on a substantially same plane; a restraint member on the another side in the perpendicular direction of the battery stack, that restrains at the another side in the perpendicular direction, such that side surfaces of the rectangular batteries on the another side in the perpendicular direction, are on a substantially same plane; an end plate on one side in the stacking direction of the battery stack, that is in contact with an end surface on the one side in the stacking direction of the battery stack, the end plate on the one side in the stacking direction restraining at the one side in the stacking direction; and an end plate on the another side in the stacking direction of the battery stack, that is in contact with an end surface on the another side in the stacking direction of the battery stack, and the end plate on the another side in the stacking direction restraining at the another side in the stacking direction. The linking unit links the end plate on the one side in the stacking direction of the first battery module to the end plate on the another side in the stacking direction of the second battery module.

A linked battery pack according to another aspect of the present disclosure, includes a first battery pack and a second battery pack that are linked together with a linking unit. Each of the first battery pack and the second battery pack includes: a plurality of battery stacks that are arranged in a plurality of rows, and each include a plurality of rectangular batteries that each have a substantially rectangular-parallelepiped shape, and are stacked in a row in a thickness direction; a shared restraint member that is between each of one and another battery stacks of two adjacent battery stacks of the battery stacks that are adjacent to each other in a perpendicular direction that is perpendicular to a stacking direction, the shared restraint member restraining: a side surface on a side of the another battery stack, in the one battery stack, and; a side surface on a side of the one battery stack, in the another battery stack; external restraint members that restrain external sides in the perpendicular direction of the battery stacks, the external sides being located at both ends in the perpendicular direction in the plurality of battery stacks; an end plate on one side in the stacking direction that is integral and restrains the one side in the stacking direction of the plurality of battery stacks; and an end plate on another side in the stacking direction that is integral and restrains the another side in the stacking direction of the plurality of battery stacks. The linking unit links the end plate on the one side of the first battery pack to the end plate on the another side of the second battery pack.

The linked battery module and the linked battery pack according to the aspects of the present disclosure each allow battery modules to be easily attached, and each allow a weight and a size to be easily reduced.

DESCRIPTION OF EMBODIMENT

Hereinafter, an exemplary embodiment of the present disclosure will be described in detail with reference to the attached drawings. It is envisaged from a beginning that if a plurality of exemplary embodiments and variations are described below, distinctive elements of the plurality of exemplary embodiments and variations are appropriately combined to make new exemplary embodiments. In a description of the exemplary embodiment described later and the drawings, an X direction represents a stacking direction in which rectangular batteries are stacked, and corresponds to a thickness direction of the rectangular batteries. A Y direction represents a perpendicular direction that is perpendicular to the stacking direction. A Z direction represents a height direction of the rectangular batteries, corresponds to a height direction of a battery module, and corresponds to a height direction of a battery pack. The X direction, Y direction, and Z direction are perpendicular to each other.

Figure 1:
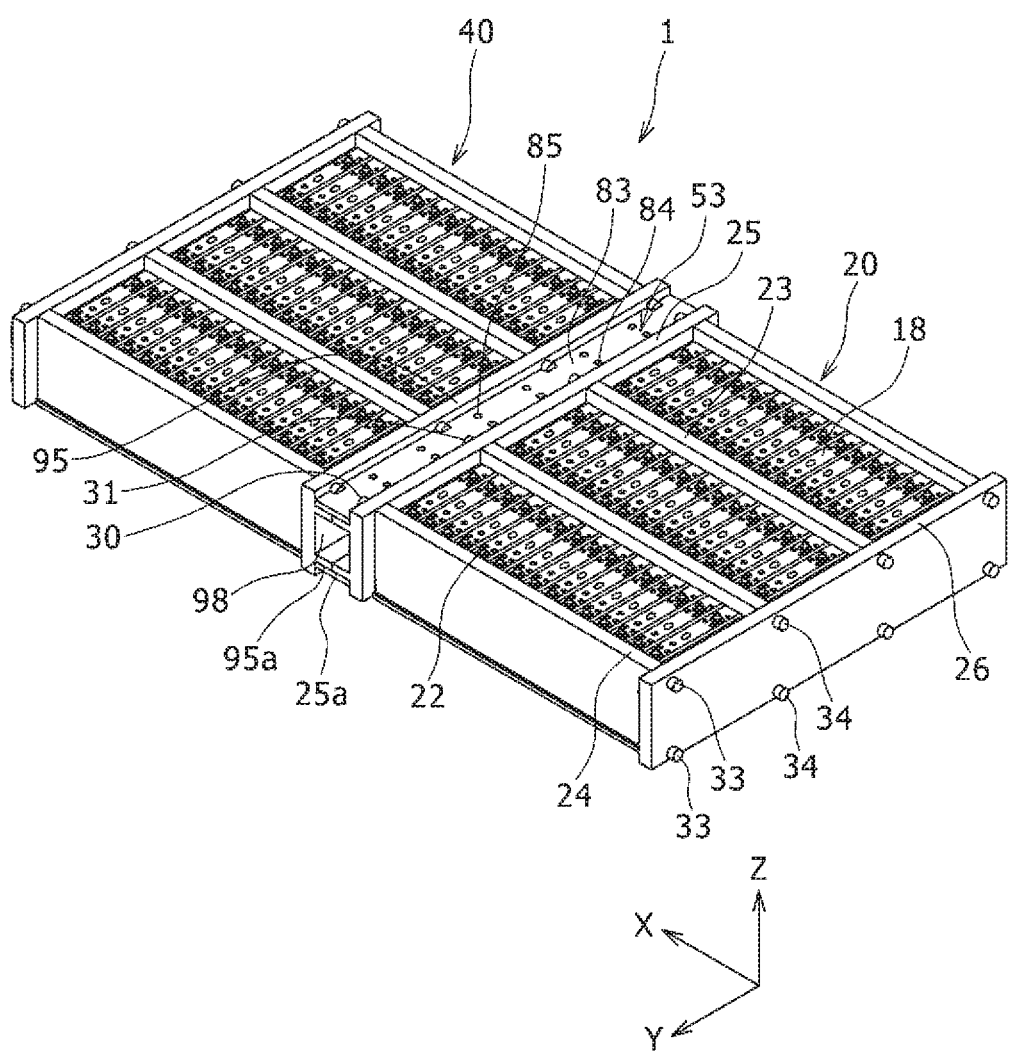
FIG. 1 is a perspective view of a linked battery pack according to an exemplary embodiment of the present disclosure.

FIG. 1 is a perspective view of linked battery pack 1 according to the exemplary embodiment of the present disclosure. As illustrated in FIG. 1, linked battery pack 1 includes two same first and second battery packs 20, 40, and linking unit 53. An end, on one side in X direction, of first battery pack 20 is joined to an end, on the other side in X direction, of second battery pack 40 to make linked battery pack 1. Hereinafter, a link structure of linked battery pack 1 will be described in detail. A description of second battery pack 40 will be omitted by a description of first battery pack 20.

The linked battery pack of the present disclosure may not include a housing or may include a housing. If the linked battery pack includes a housing, a configuration illustrated in FIG. 1 is a main body of the linked battery pack housed in the housing. The housing includes a bottom plate and a cover, for example. The bottom plate has a substantially rectangular shape in a plan view. Only one side, in the Z direction, of the cover is open, and the cover defines a space that has a substantially rectangular-parallelepiped shape. The main body of the linked battery pack is placed on an upper surface of the bottom plate. The main body of the linked battery pack is covered with the cover. Consequently, the main body of the linked battery pack is housed within the space. The cover in that state is fixed to the bottom plate with a fixing means, such as fastening members or adhesive. In that way, the main body of the linked battery pack is disposed within a case. The main body of the linked battery pack may not be fixed to the bottom plate. Preferably, however, the main body of the linked battery pack is fastened to the bottom plate at some positions of the main body of the linked battery pack, preferably, at four corners of the main body of the linked battery pack since rigidity of the linked battery pack increases, and the main body of the linked battery pack is accurately positioned. Alternatively, it is preferable that the main body of the linked battery pack is fastened to a vehicle frame since rigidity of the vehicle frame increases.

First battery pack 20 includes a plurality of battery stacks 22, a plurality of shared restraint members 23, two external restraint members 24, end plate 25 on the one side, and end plate 26 on the other side. The plurality of battery stacks 22 are arranged in a plurality of rows. Each of battery stacks 22 includes a plurality of rectangular (=prismatic) batteries 18. The plurality of rectangular batteries 18 each have a substantially rectangular-parallelepiped shape, and are tightly stacked in a row in the X direction. The plurality of rectangular batteries 18 that have been stacked are in a same posture. For example, rectangular batteries 18 are rechargeable secondary batteries, such as lithium-ion batteries, nickel metal hydride batteries, or nickel-cadmium batteries. A main surface of each of rectangular batteries 18 is covered with an insulating plate, such as a heat shrink tube. In FIG. 1, first battery pack 20 includes battery stacks 22 arranged in three rows. However, a battery pack may include battery stacks arranged in two rows, or may include battery stacks arranged in at least four rows. Each of battery stacks 22 may include a plurality of separators (not illustrated). The plurality of separators are made of resin. The plurality of separators and the plurality of rectangular batteries 18 are alternately stacked. The separators may insulate rectangular batteries 18 from adjacent rectangular batteries 18.

Each of shared restraint members 23 is between two each of adjacent battery stacks 22 that are adjacent to each other in the Y direction. Each of shared restraint members 23 is a plate member that has a shape like a long flat plate. Each of shared restraint members 23 extends in the X direction. A longitudinal direction of each of shared restraint members 23 corresponds to the X direction. A width direction of each of shared restraint members 23 corresponds to the Z direction. With respect to two battery stacks 22 that are adjacent to each other in the Y direction, one shared restraint member 23 restrains a side surface, adjacent to other battery stack 22, of one battery stack 22, and restrains a side surface, adjacent to one battery stack 22, of other battery stack 22.

External restraint members 24 restrain external sides, in Y direction, of battery stacks 22, respectively, that are located at both ends, in Y direction, of the plurality of rows of battery stacks 22. Each of external restraint members 24 is a plate member that has a shape like a long flat plate. Each of external restraint members 24 extends in the X direction. A longitudinal direction of each of external restraint members 24 corresponds to the X direction. A width direction of each of external restraint members 24 corresponds to the Z direction.

End plate 25 on the one side restrains one side, in the X direction, of the plurality of rows of battery stacks 22. End plate 25 on the one side is a plate member that has a substantially rectangular shape in a plan view and has a shape like a flat plate, and extends in the Y direction. A longitudinal direction of end plate 25 on the one side corresponds to the Y direction. A width direction of end plate 25 on the one side corresponds to the Z direction. End plate 25 on the one side is fixed to an end surface, on one side in X direction, of each of external restraint members 24 with a plurality of bolts 30. The plurality of bolts 30 are arranged in Z direction, and are apart from each other. Further, end plate 25 on the one side is fixed to an end surface, on one side in the X direction, of each of shared restraint members 23 with a plurality of bolts 31. The plurality of bolts 31 are arranged in Z direction, and are apart from each other.

End plate 26 on the other side restrains the other side, in the X direction, of the plurality of rows of battery stacks 22. End plate 26 on the other side is a plate member that has a substantially rectangular shape in a plan view and has a shape like a flat plate, and extends in the Y direction. A longitudinal direction of end plate 26 on the other side corresponds to the Y direction. A width direction of end plate 26 on the other side corresponds to the Z direction. End plate 26 on the other side is fixed to an end surface, on the other side in the X direction, of each of external restraint members 24 with a plurality of bolts 33. The plurality of bolts 33 are arranged in the Z direction, and are apart from each other. Further, end plate 26 on the other side is fixed to an end surface, on the other side in the X direction, of each of shared restraint members 23 with a plurality of bolts 34. The plurality of bolts 34 are arranged in the Z direction, and are apart from each other.

All shared restraint members 23 and two external restraint members 24 are fixed to end plate 25 on the one side and end plate 26 on the other side. Consequently, the plurality of battery stacks 22 arranged in the plurality of rows, all shared restraint members 23, two external restraint members 24, end plate 25 on the one side, and end plate 26 on the other side are joined together and integrated. Shared restraint member 23, external restraint member 24, end plate 25 on the one side, and end plate 26 on the other side tightly surround battery stack 22 that is located at an end in the Y direction. Predetermined compressing pressure in the X direction is applied to battery stack 22. Consequently, the compressing pressure reduces deformation or expansion of battery stack 22. Two shared restraint members 23, end plate 25 on the one side, and end plate 26 on the other side tightly surround battery stack 22 that is not located at an end in the Y direction. Predetermined compressing pressure in the X direction is applied to battery stack 22. Consequently, also in that case, the compressing pressure reduces deformation or expansion of battery stack 22.

Each battery stack 22 may include a spacer (not illustrated) that is between rectangular battery 18 that is at one end in the X direction and end plate 25 on the one side, and fills a gap between rectangular battery 18 that is at the one end and end plate 25 on the one side. Further, each battery stack 22 may include a spacer (not illustrated) that is between rectangular battery 18 that is at the other end in the X direction and end plate 26 on the other side, and fills a gap between rectangular battery 18 that is at the other end and end plate 26 on the other side. Consequently, battery stack 22 is surely fixed in a stacking direction. Further, end plate 25 on the one side and end plate 26 on the other side are tightly fixed to end surfaces of all shared restraint members 23, and end surfaces of two external restraint members 24. Preferably, the spacers are elastic. In that case, even if variation or change in dimensions of a gap between rectangular battery 18 at an end in the X direction and at least one of end plate 25 on the one side and end plate 26 on the other side occurs, the spacers easily fill the gap between rectangular battery 18 at an end in the X direction and at least one of end plate 25 on the one side and end plate 26 on the other side, and thus battery stacks 22 are surely fixed, and end plate 25 on the one side and end plate 26 on the other side are tightly fixed to end surfaces of all shared restraint members 23, and end surfaces of two external restraint members 24.

First battery pack 20 and second battery pack 40 are arranged in such a manner that end plate 25 on the one side of first battery pack 20 is opposite end plate 95 on the other side of second battery pack 40. A configuration of end plate 25 on the one side of first battery pack 20 is same as a configuration of end plate 95 on the other side of second battery pack 40. A direction in which first battery pack 20 is disposed and a direction in which second battery pack 40 is disposed are directions that are opposite to each other in the X direction.

End plates 25, 95 include two respective projections 25a, 95a. Two projections 25a, 95a each have a plate-like shape, project externally in the X direction, and extend in the Y direction. Two projections 25a, 95a each of which has a plate-like shape are arranged in the Z direction and are apart from each other. One of projections 25a of end plate 25 on the one side is at a height same as a height of one of projections 95a of end plate 95 on the other side. Another projection 25a of end plate 25 on the one side is at a height same as a height of another projection 95a of end plate 95 on the other side. One of projections 25a of end plate 25 on the one side forms one first projection on the one side. Another projection 25a of end plate 25 on the one side forms the other first projection on the other side. Further, one of projections 95a of end plate 95 on the other side forms one second projection on the other side. Another projection 95a of end plate 95 on the other side forms the other second projection on the other side. An end surface of one of projections 25a of end plate 25 on the one side is made into contact with an end surface of one of projections 95a of end plate 95 on the other side. An end surface of another projection 25a of end plate 25 on the one side is made into contact with an end surface of another projection 95a of end plate 95 on the other side. End plate 25 on the one side and end plate 95 on the other side are accurately positioned in the X direction by making projections 25a, 95a into contact with each other.

Linking unit 53 includes plates 83, bolts 84, and bolts 85. Plates 83 are disposed outside, in the Z direction, two projections 25a, 95a, respectively, that have been made into contact with each other. Plates 83 are across two projections 25a, 95a, respectively. One of plates 83 forms a plate on one side. Another plate 83 forms a plate on the other side. Bolts 84 fix one of plates 83 to one of projections 25a. Bolts 85 fix the one of plates 83 to one of projections 95a. Bolts 84 form first fastening members on the one side. Bolts 85 form second fastening members on the one side. A first fastening member on the other side fixes another plate 83 to another projection 25a (not illustrated). A second fastening member on the other side fixes another plate 83 to another projection 95a (not illustrated). Consequently, end plate 25 on the one side of first battery pack 20 is joined to end plate 95 on the other side of second battery pack 40. Consequently, first battery pack 20 and second battery pack 40 are integrated.

The integration forms chamber 98 at a joint portion where first battery pack 20 is joined to second battery pack 40, more specifically, between two projections 25a and between two projections 95a in the Z direction that have been made into contact with each other. Chamber 98 has a substantially rectangular cross-section. In the above description, the pair of projections 25a of end plate 25 on the one side are made into contact with the pair of projections 95a of end plate 95 on the other side, respectively. However, gaps in X direction may be formed between projections of an end plate on the one side and projections of an end plate on the other side that are opposite to each other, respectively.

In an example illustrated in FIG. 1, each of rectangular batteries 18 includes both a positive electrode and a negative electrode at ends on an upper surface in the Z direction. For example, the plurality of rectangular batteries 18 in battery stack 22 are electrically connected with each other in series with bus bars not illustrated. The plurality of battery stacks 22 in linked battery pack 1 are electrically connected with each other in parallel with bus bars not illustrated. Chamber 98 houses high-voltage cables (not illustrated), or a cable harness, used to supply electric power to, for example, a motor generator from linked battery pack 1. The plurality of rectangular batteries in the battery stack may be electrically connected with each other in parallel. The plurality of battery stacks in the linked battery pack may be electrically connected with each other in series. The first battery pack and the second battery pack may be electrically connected with each other in series, or may be electrically connected with each other in parallel.

Figure 2:
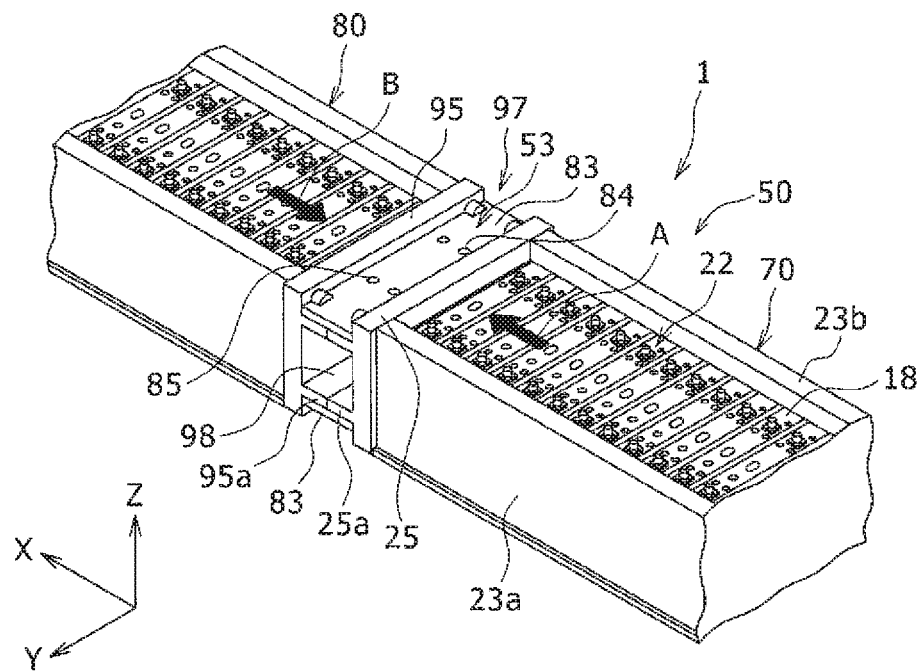
FIG. 2 is a perspective view of part of the linked battery pack, and is a perspective view of part of a linked battery module in the linked battery pack.
Figure 3:
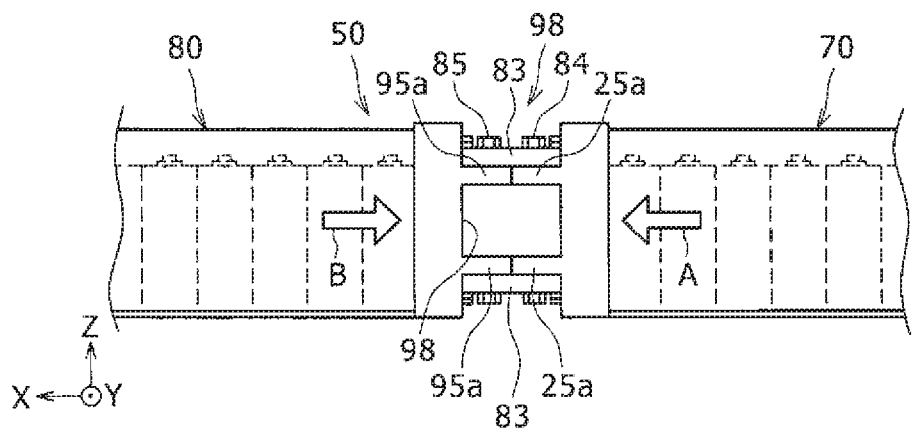
FIG. 3 is a side view of part of the linked battery module.

FIG. 2 is a perspective view of part of linked battery pack 1, and is a perspective view of part of linked battery module 50 in linked battery pack 1. FIG. 3 is a side view of part of linked battery module 50.

As illustrated in FIG. 2, linked battery module 50 includes first battery module 70, second battery module 80, and linking unit 53. First battery module 70 is same as second battery module 80. As described above, the linking unit includes plates 83, bolts 84, and bolts 85, and links end plate 25 on the one side of first battery module 70 to end plate 95 on the other side of second battery module 80. A description of second battery module 80 will be omitted by a description of first battery module 70. A description of a link structure between first battery module 70 and second battery module 80 will be omitted by the above description of the link structure between first battery pack 20 and second battery pack 40.

First battery module 70 includes battery stack 22 described above, restraint member 23*a* on the one side, restraint member 23*b* on the other side, end plate 25 on the one side, and end plate 26 on the other side (see FIG. 1). Restraint member 23*a* on the one side restrains at the one side in the Y direction of battery stack 22, such that side surfaces of rectangular batteries 18 on the one side in the Y direction of each rectangular battery 18, are on a substantially same plane. Restraint member 23*b* on the other side restrains at the other side in the Y direction of battery stack 22, such that side surfaces of rectangular batteries 18 on the other side in the Y direction of each rectangular battery 18, are on a substantially same plane. End plate 25 on the one side is in contact with an end surface, on one side in the X direction, of battery stack 22, and thus restrains at the one side, in the X direction, of battery stack 22. End plate 26 on the other side is in contact with an end surface, on the other side in the X direction, of battery stack 22, and thus restrains at the other side, in the X direction, of battery stack 22.

Restraint member 23*a* on the one side and restraint member 23*b* on the other side of first battery module 70 that does not exist at an end in the Y direction each correspond to shared restraint member 23 (see FIG. 1) that is between two each of battery stacks 22 that are adjacent to each other in the Y direction. One of the restraint member on the one side and the restraint member on the other side of first battery module 70 that is at an end in the Y direction corresponds to shared restraint member 23. The other one of the restraint member on the one side and the restraint member on the other side corresponds to external restraint member 24 (see FIG. 1). All first battery modules 70 that are stacked in the Y direction share same end plate 25 on the one side and same end plate 26 on the other side (see FIG. 1).

According to the above exemplary embodiment, first battery module 70 and second battery module 80 are integrated. Therefore, a plurality of battery modules 70, 80 are moved together, workability is improved, and the battery modules are easily installed.

Further, end plate 25 on the one side of first battery module 70 is joined to end plate 95 on the other side of second battery module 80. Linkage 97 that has a high rigidity and links first and second battery modules 70, 80 together absorbs and confines expansion of first and second battery modules 70, 80 illustrated with arrows A, B in FIGS. 2 and 3. Therefore, linked battery pack 1 does not need a housing. Alternatively, even if the linked battery pack includes a housing, the housing does not need to carry rigidity between battery modules 70, 80. Consequently, rigidity of the housing is reduced, and a plate thickness of the housing is reduced. Consequently, a weight and a size of linked battery module 50 are reduced. Therefore, a weight and a size of linked battery pack 1 are reduced.

If the linked battery pack includes a housing, a configuration designated by reference numeral 1 in FIG. 1 is a main body of the linked battery pack housed within the housing. However, the main body of the linked battery pack does not need to be fixed to the housing. Preferably, however, the main body of the linked battery pack is fastened to a bottom plate of the housing at least two positions of the main body of the linked battery pack, preferably, four corners of the main body of the linked battery pack or at a plurality of positions on each side of the main body of the linked battery pack since rigidity of the linked battery pack increases. Alternatively, it is preferable that the main body of the linked battery pack is fastened to a vehicle frame since rigidity of the vehicle frame increases.

Further, end plate 25 on the one side of first battery pack 20 and end plate 95 on the other side of second battery pack 40 have the pair of projections 25*a*, 95*a*, respectively, that project in the X direction. Two pairs of two projections 25*a*, 95*a* that have been made into contact with each other are joined together with bolts 84, 85 through plates 83. Therefore, plates 83 reinforce the link structure between first battery pack 20 and second battery pack 40, and strength and rigidity of a joint structure further increase. Consequently, a weight and a size of linked battery pack 1 are further reduced.

Chamber 98 is formed between two pairs of two projections 25*a*, 95*a* in the Z direction that have been made into contact with each other. Chamber 98 has a substantially rectangular cross-section. Chamber 98 houses high-voltage cables used to supply electric power to, for example, a motor generator from linked battery pack 1. Since the high-voltage cables are thus housed, the high-voltage cables are protected. Consequently, even if linked battery pack 1 is deformed by impact conveyed to linked battery pack 1, the high-voltage cables surely do not break or do not cause short circuit. Therefore, rigidity of linked battery pack 1 can be reduced. Consequently, sizes and weights of some members and the housing are reduced. Therefore, a weight and a size of linked battery pack 1 are further reduced.

Further, each of shared restraint members 23 is between two each of battery stacks 22 that are adjacent to each other in the Y direction. Two each of battery stacks 22 that are adjacent to each other in the Y direction share each shared restraint member 23. Therefore, the number of members is reduced and dimensions in the Y direction is reduced, compared with a case in which the battery stacks are separately restrained, and both lateral sides of each of the battery stacks are restrained with a pair of special binding bars. Consequently, a weight and a size of linked battery pack 1 are reduced.

The present disclosure should not be limited to the exemplary embodiment described above and variations of the exemplary embodiment described above, but the present disclosure is variously modified or varied within the scope of matters recited in the appended claims or equivalents of the appended claims.

For example, in the above exemplary embodiment, two battery packs, that is, first battery pack 20 and second battery pack 40, are linked together to form linked battery pack 1. However, a linked battery pack may include at least three battery packs that are linked together and each include a plurality of battery stacks stacked in the Y direction.

Figure 4:
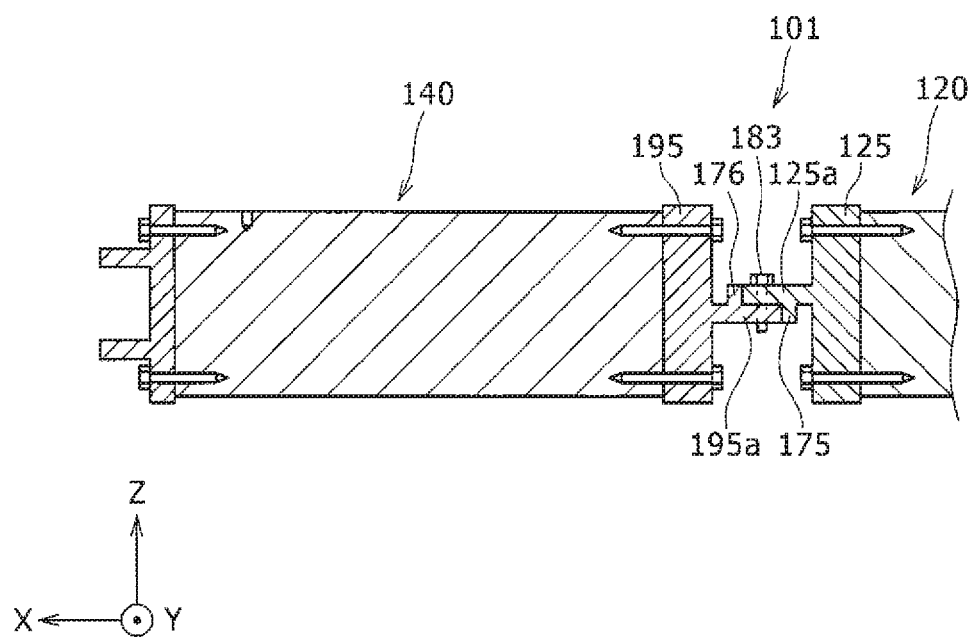
FIG. 4 is a schematic view that illustrates a configuration around a joint of a battery pack according to a modified example.

In the above description, chamber 98 is formed at the joint between first battery pack 20 and second battery pack 40, and has a substantially rectangular cross-section. However, as illustrated in FIG. 4, that is, a schematic view that illustrates a configuration around a joint of battery pack 101 according to a modified example, end plate on one side 125 of first battery pack 120 may include one projection 125*a* that projects toward one side in the X direction and extends in the Y direction. Further, end plate on the other side 195 of second battery pack 140 may include one projection 195*a* that projects toward the other side in the X direction and extends in the Y direction.

Projection 125*a* and projection 195*a* may be alternately arranged in the Z direction. When projection 125*a* and projection 195*a* are seen in the Z direction, a portion of projection 125*a* and a portion of projection 195*a* may overlap each other. The portion of projection 125*a* and the portion of projection 195*a* that overlap each other when projection 125*a* and projection 195*a* are seen in the Z direction are fastened together with bolts 183 that are fastening members for fastening between the first projection and the second projection. Consequently, end plate on one side 125 and end plate on the other side 195 are joined together, and first battery pack 120 and second battery pack 140 are linked together.

In that case, as illustrated in FIG. 4, projection 125*a* of end plate 125 on one side may include Z-direction projection 175 that projects toward one side in the Z direction, and is in contact with an end of projection 195*a* of end plate 195 on the other side and thus regulates movement of projection 195*a* in the X direction. Further, projection 195*a* of end plate 195 on the other side may include Z-direction projection 176 that projects toward the other side in Z direction, and is in contact with an end of projection 125*a* of end plate 125 on one side and thus regulates movement of projection 125*a* in the X direction. The configuration is preferable since end plate 125 on one side and end plate 195 on the other side are accurately positioned in X direction.

Figure 5:
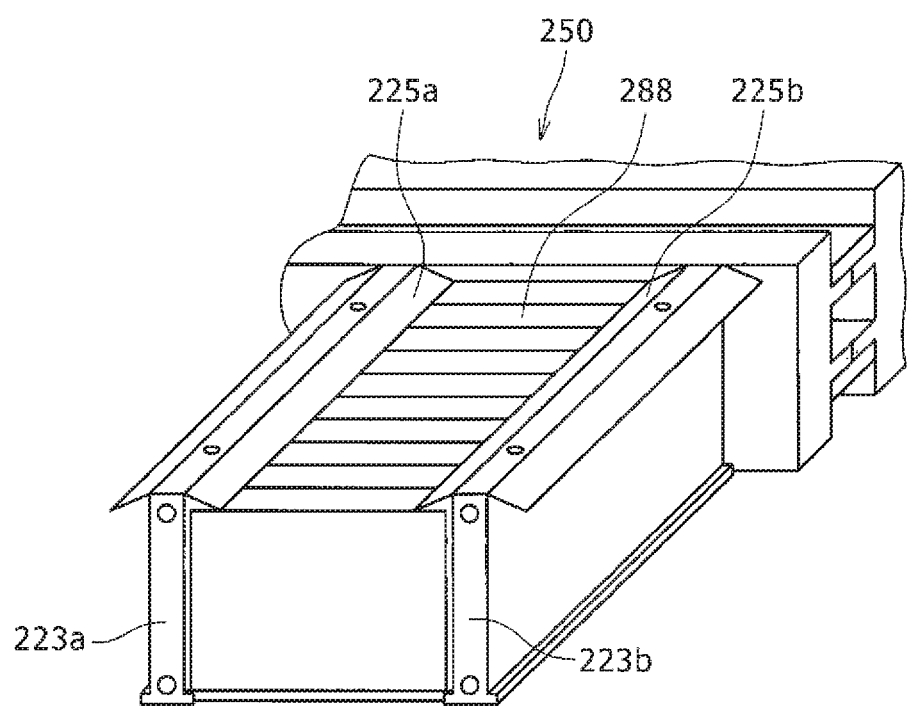
FIG. 5 is a perspective view of part of a battery module according to another modified example.

Further, as illustrated in FIG. 5, that is, a perspective view of part of battery module 250 according to another modified example, restraint member 223*a* on one side and restraint member 223*b* on the other side may include respective Z-direction movement regulators 225*a*, 225*b* that each have a shape like a long plate. Z-direction movement regulators 225*a*, 225*b* overlap ends, in a longitudinal direction, of rectangular batteries 288 when Z-direction movement regulators 225*a*, 225*b* are seen in the Z direction. Consequently, rectangular batteries 288 surely do not disengage from battery module 250 in the Z direction.

Figure 6:
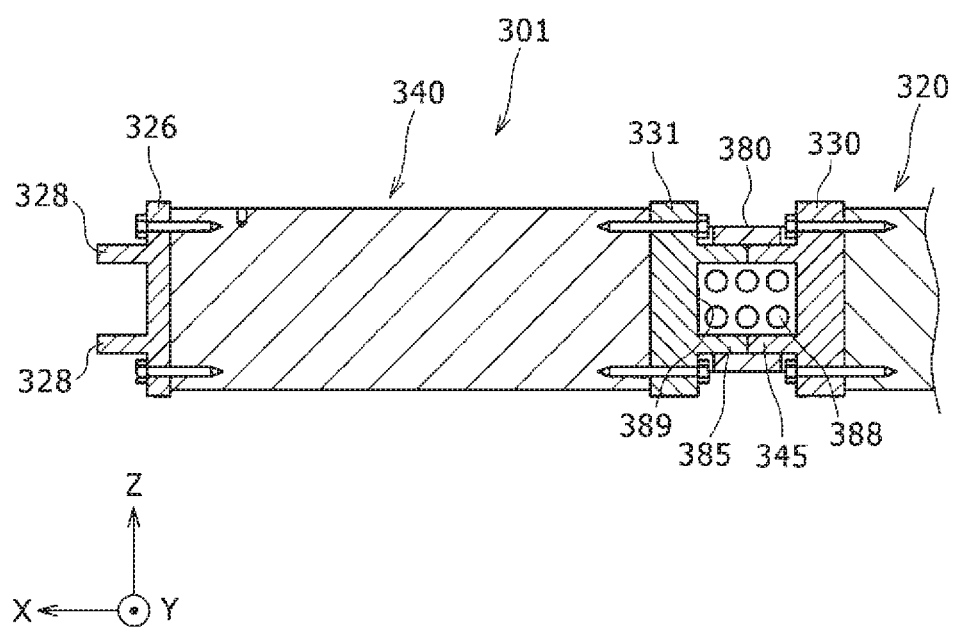
FIG. 6 is a cross-sectional view of part of a linked battery pack according to a further modified example.

As illustrated in FIG. 6, or a cross-sectional view of part of linked battery pack 301 according to a further modified example, end plate 326 on the other side disposed on an external side, in the X direction, of linked battery pack 301 may include at least one rib 328 that projects externally in the X direction. Consequently, rigidity of linked battery pack 301 may be increased. As illustrated in FIG. 6, also in linked battery pack 301 according to the modified example, a pair of projections 345 of end plate 330 on one end of first battery pack 320 are made into contact with a pair of projections 385 of end plate 331 on the other side of second battery pack 340. Four projections 345, 345, 385, 385 and both side surfaces that extend substantially parallel to a YZ plane define chamber 389 that has a rectangular XZ cross-section. Linked battery pack 301 includes high-voltage cables 388 used to supply electric power to external equipment. High-voltage cables 388 are housed in chamber 389.

Figure 7:
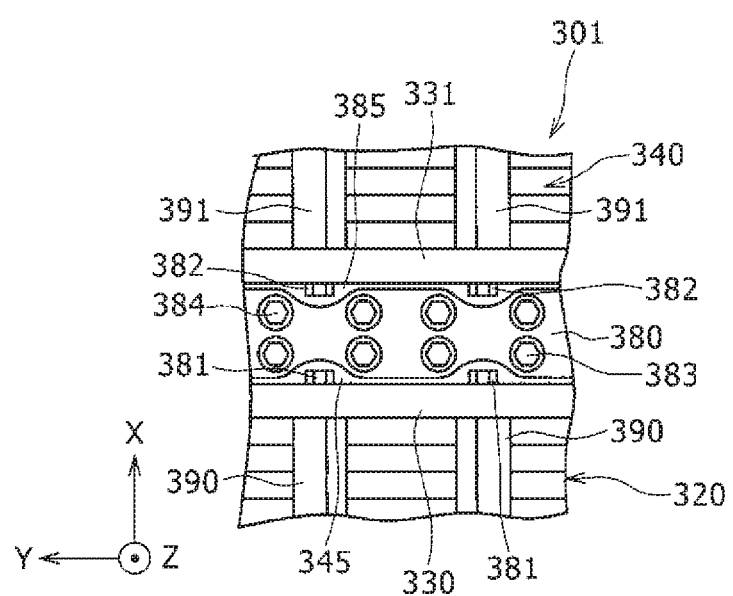
FIG. 7 is a plan view of part of the linked battery pack illustrated in FIG. 6.

As illustrated in FIG. 7, that is, a plan view of part of linked battery pack 301 illustrated in FIG. 6, plate 380 that extends in the Y direction may be used to join projection 345 of end plate 330 on one side of first battery pack 320 to projection 385 of end plate 331 on the other side of second battery pack 340.

As illustrated in FIG. 7, plate 380 may have a narrow width at positions, in the Y direction, where there are bolts 381, 382 that fix end plate 330 on one side and end plate 391 on the side to restraint members 390, 391. The narrow width is narrower than a width of other positions of plate 380. Alternatively, plate 380 may not overlap bolts 381, 382 when plate 380 is seen from above in the Z direction. Bolts 381 form fastening members for end plate on one side. Bolts 382 form fastening members for end plate on the other side. The configuration is preferable since after restraint members 390, 391 are fixed to end plate 330 on one side and end plate 331 on the other side with bolts 381, 382, two projections 345 and 385 are fixed to each other with plate 380, and thus linked battery pack 301 are easily made. Preferably, in each of joined battery modules, plate 380 is joined to projection 345 with at least two bolts 383, and plate 380 is joined to projection 385 with at least two bolts 384. However, plate 380 may be joined to projection 385 with two bolts 383 at two corners of plate 380, and plate 380 may be joined to projection 385 with two bolts 384 at two remaining corners of plate 380.

The invention claimed is:

1. A linked battery module, comprising:
a first battery module and a second battery module that are linked together with a linking unit, wherein:
each of the first battery module and the second battery module includes:
a battery stack that includes a plurality of rectangular batteries that each have a substantially rectangular-parallelepiped shape, and are stacked in a row in a thickness direction that is a stacking direction;
a first restraint member for restraining one side face of each of the plurality of rectangular batteries;
a second restraint member for restraining another side face of each of the plurality of rectangular batteries opposite to the one side face;
a first end plate facing a first end face, in the stacking direction, of the battery stack, and restraining the first end face in the stacking direction; and
a second end plate facing a second end face opposite to the first end face, on the another side in the stacking direction, of the battery stack, and restraining the second end face in the stacking direction,
the first end plate of the first battery module comprises one or more first projections protruding along the stacking direction, and the one or more first projections protrude from a first face of the first end plate, which is opposite to a second face of the first end plate in the stacking direction, the second face of the first end plate faces the first end face, the second end plate comprises one or more second projections protruding along the stacking direction, and the one or more second projections protrude from a first face of the second end plate, which is opposite to a second face of the second end plate in the stacking direction, the second face of the second end plate faces the second end face, the linking unit links the one or more first projections of the first end plate of the first battery module to the one or more second projections of the second end plate of the second battery module, and the one or more first projections and the one or more second projections are disposed between the first end plate of the first battery module and the second end plate of the second battery module, the one or more first projections comprise a first plate like portion extending in the stacking direction, a thickness direction of the first plate like potion is perpendicular to the stacking direction and a width direction where the one side face and the other side face are aligned, the first plate like portion has a first end and a second end in the stacking direction, the second end of the first plate like portion joints to a first connection area on the first face of the first end plate, the first connection area is separated from both of a first edge and second edge of the first face of the first end plate in the thickness direction, the one or more second projections comprise a second plate like portion extending in the stacking direction, a thickness direction of the second plate like potion is perpendicular to the stacking direction and the width direction, the second plate like portion has a first end and a second end in the stacking direction, the second end of the second plate like portion joints to a second connection area on the first face of the second end plate, the second connection area is separated from both of a first edge and second edge of the first face of the second end plate in the thickness direction, the one or more first projections comprise a first pair of projections that are apart from each other in a height direction, the one or more second projections comprise a second pair of projections that are apart from each other in the height direction, the linking unit includes:
  a first plate that is in contact with: at least part of a surface of one of the first pair of projections, and at least part of a surface of one of the second pair of projections;
  a second plate that is in contact with: at least part of a surface of another of the first pair of projections, and at least part of a surface of another of the second pair of projections;
  a first fastening member that fastens the one of the first pair of projections and the first plate in the height direction together;
  a second fastening member that fastens the one of the second pair of projections and the first plate in the height direction together;
  a third fastening member that fastens the another of the first pair of projections and the second plate in the height direction together; and
  a fourth fastening member that fastens the another of the second pair of projections and the second plate in the height direction together, and wherein a chamber exists between the first plate and the second plate in the height direction, and extends in the perpendicular direction, and the first pair of projections and the second pair of projections are disposed between the first plate and the second plate in the height direction.

2. The linked battery module according to claim 1, further comprising:
  at least one first end plate fastening member for the first end plate that fastens the first end plate of the first battery module, to the first restraint member of the first battery module and the second restraint member of the first battery module; and
  at least one second end plate fastening member for the second end plate that fastens the second end plate of the second battery module, to the first restraint member of the second battery module and the second restraint member of the second battery module,
  wherein neither the first plate nor the second plate overlap the at least one first end plate fastening member and the at least one second end plate fastening member when the first plate and the second plate are seen in the height direction.

3. The linked battery module according to claim 1, wherein a space is provided between the first end plate and the second end plate.

4. The linked battery module according to claim 1, wherein the first and second restraint member and the first and second end plates form a rectangular shape in plan view, shorts sides of the rectangular shape correspond to the first and second end plates and ling sides of the rectangular shape correspond to the first and second restraint member.

* * * * *